US012559653B2

(12) United States Patent
Liu et al.

(10) Patent No.: US 12,559,653 B2
(45) Date of Patent: Feb. 24, 2026

(54) ARTICLES WITH AN ADHESIVE LAYER

(71) Applicant: Dow Global Technologies LLC, Midland, MI (US)

(72) Inventors: Chun Liu, Midland, MI (US); Qichun Wan, Midland, MI (US); Colin LiPiShan, Lake Jackson, TX (US); Lena T. Nguyen, Lake Jackson, TX (US); Kyle D. Anderson, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 1453 days.

(21) Appl. No.: 16/608,543

(22) PCT Filed: Apr. 27, 2018

(86) PCT No.: PCT/US2018/029847
§ 371 (c)(1),
(2) Date: Oct. 25, 2019

(87) PCT Pub. No.: WO2018/200987
PCT Pub. Date: Nov. 1, 2018

(65) Prior Publication Data
US 2020/0087550 A1 Mar. 19, 2020

Related U.S. Application Data

(60) Provisional application No. 62/491,624, filed on Apr. 28, 2017.

(51) Int. Cl.
| | |
|---|---|
| *C09J 123/06* | (2006.01) |
| *C08K 5/14* | (2006.01) |
| *C09J 109/00* | (2006.01) |
| *C09J 151/04* | (2006.01) |
| *C09J 151/06* | (2006.01) |
| *F16H 7/02* | (2006.01) |
| *B32B 5/02* | (2006.01) |
| *B32B 7/12* | (2006.01) |
| *B32B 27/12* | (2006.01) |
| *B32B 27/32* | (2006.01) |

(52) U.S. Cl.
CPC .............. *C09J 123/06* (2013.01); *C08K 5/14* (2013.01); *C09J 109/00* (2013.01); *C09J 151/04* (2013.01); *C09J 151/06* (2013.01); *F16H 7/02* (2013.01); *B32B 5/02* (2013.01); *B32B 7/12* (2013.01); *B32B 27/12* (2013.01); *B32B 27/32* (2013.01); *B32B 2262/0284* (2013.01); *B32B 2262/062* (2013.01); *B32B 2262/14* (2013.01); *B32B 2307/748* (2013.01); *B32B 2433/04* (2013.01); *C08L 2312/00* (2013.01); *C09J 2401/006* (2013.01); *C09J 2409/006* (2013.01); *C09J 2423/046* (2013.01)

(58) Field of Classification Search
CPC ...... C09J 123/06; C09J 109/00; C09J 151/04; C09J 151/06; C08K 5/14; F16H 7/02
USPC ........................................................ 442/98
See application file for complete search history.

(56) References Cited

U.S. PATENT DOCUMENTS

| | | | |
|---|---|---|---|
| 5,552,460 A | 9/1996 | Schmidt et al. | |
| 6,641,905 B1 | 11/2003 | Fujimoto et al. | |
| 7,608,668 B2 | 10/2009 | Li Pi Shan et al. | |
| 7,645,829 B2 | 1/2010 | Tse et al. | |
| 7,858,706 B2 | 12/2010 | Arriola et al. | |
| 7,893,166 B2 | 2/2011 | Li Pi Shan et al. | |
| 7,935,890 B2 | 5/2011 | Holzmueller et al. | |
| 7,947,793 B2 | 5/2011 | Marchand et al. | |
| 8,378,025 B2 | 2/2013 | Botros et al. | |
| 8,653,191 B2 | 2/2014 | Ansems et al. | |
| 2010/0029827 A1 | 2/2010 | Ansems et al. | |
| 2010/0292403 A1 | 11/2010 | Ansems et al. | |
| 2011/0223439 A1 | 9/2011 | Botros et al. | |
| 2011/0262747 A1* | 10/2011 | Yalvac .............. | C09J 123/0807 427/208.2 |
| 2013/0059989 A1* | 3/2013 | Ansems ................ | C08L 51/003 525/92 C |

FOREIGN PATENT DOCUMENTS

| | | | | |
|---|---|---|---|---|
| CA | 2477685 A1 | 9/2003 | | |
| CA | 2565035 A1 | 12/2005 | | |
| CN | 1016058225 A | 12/2009 | | |
| EP | 1108750 B1 * | 11/2007 | .............. | C08L 23/16 |
| GB | 2420348 A | 5/2006 | | |
| JP | 2006-225551 A | 8/2006 | | |
| TW | I480372 B | 4/2015 | | |
| WO | 00/53418 A1 | 9/2000 | | |
| WO | 01/68784 A1 | 9/2001 | | |
| WO | 2005/108442 A1 | 11/2005 | | |
| WO | 2005/113609 A1 | 12/2005 | | |

* cited by examiner

*Primary Examiner* — Vincent Tatesure

(74) *Attorney, Agent, or Firm* — Boyle Fredrickson S.C.

(57) ABSTRACT

The present disclosure provides an article. The article includes an adhesive layer with two opposing surfaces. The adhesive layer includes (i) a functionalized ethylene-based polymer having a melt index from 0.1 g/10 min to 300 g/10 min; (ii) from 0.01 wt % to 45 wt % of a functionalized hydrocarbon; (iii) a tackifier; and (iv) optionally, a cross-linking agent.

9 Claims, No Drawings

ARTICLES WITH AN ADHESIVE LAYER

FIELD

The present disclosure relates to an article with an adhesive layer, and further an adhesive layer and a polyester fabric, and further a polyester fabric adhered to a polyolefin substrate via the adhesive layer.

BACKGROUND

Ethylene-based elastomers have numerous applications in timing belts (e.g., automotive timing belts), conveyor belts, textile architectures, tubing, packaging films, and wire and cable applications. However, the non-polar molecular nature of ethylene-based elastomers make it difficult to be adhered, painted and/or printed due to the low surface energy of conventional polyolefin adhesives.

In the conventional automotive timing belt assembly process, adhesion between layers of the belt must be strong enough after an initial compression process (temperature of 20° C.-80° C., pressure of 0 MPa-0.5 MPa, for a period of 1-5 seconds) so that the individual layers of the belt do not separate from one another when transferring to a high temperature curing oven. Additionally, adhesion between layers of the belt must be strong enough after a final compression process (temperature of 130° C.-190° C., a pressure of 0.1 MPa-1.8 MPa, for a period of 2-25 minutes) so that the layers do not separate from one another during a use of the automotive timing belt.

A need exists for an article, and an automotive timing belt laminated structure in particular, containing an adhesive layer capable of adhering to a layer containing an ethylene-based elastomer, and further for adhering an elastomeric layer containing an ethylene-based elastomer to a fabric layer (such as a fabric layer containing a polar polymer). A need further exists for an article, and an automotive timing belt laminated structure in particular, containing an adhesive layer that exhibits high peel strength after initial compression and after final compression.

SUMMARY

The present disclosure provides an article. The article includes an adhesive layer with two opposing surfaces. The adhesive layer includes (i) a functionalized ethylene-based polymer having a melt index from 0.1 g/10 min to 300 g/10 min; (ii) from 0.01 wt % to 45 wt % of a functionalized hydrocarbon; (iii) a tackifier; and (iv) optionally, a crosslinking agent.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "acid anhydride" is a compound that has two acyl groups bonded to the same oxygen atom.

An "acyl group" is a moiety derived by the removal of a hydroxyl group from a carboxylic acid.

An "ethylene-based polymer" or "ethylene polymer" or "polyethylene" is a polymer that contains a majority amount, or greater than 50 wt %, of polymerized ethylene based on the weight of the polymer, and, optionally, may comprise at least one comonomer.

An "ethylene/α-olefin interpolymer" is an interpolymer that contains a majority amount of polymerized ethylene, based on the weight of the interpolymer, and at least one α-olefin.

"Fabric" is a woven or non-woven (such as knitted) structure formed from individual fibers or yarn.

"Fiber" and like terms refer to an elongated column of entangled filaments.

"Filament" and like terms refer to a single, continuous strand of elongated material having generally round cross-section and a length to diameter ratio of greater than 10.

A "hydrocarbon" is a compound that contains only hydrogen and carbon atoms. The hydrocarbon can be (i) branched or unbranched, (ii) saturated or unsaturated (iii) cyclic or acyclic, and (iv) any combination of (i)-(iii). Nonlimiting examples of hydrocarbons include alkanes, alkenes, and alkynes.

An "interpolymer" is a polymer prepared by the polymerization of at least two different types of monomers. The generic term interpolymer thus includes copolymers (employed to refer to polymers prepared from only two different types of monomers), terpolymers (employed to refer to polymers prepared from three different types of monomers), and polymers prepared from more than three different types of monomers.

"Nonwoven" is a web or a fabric having a structure of individual fibers or threads which are randomly interlaid, but not in an identifiable manner as is the case of a knitted fabric.

An "olefin-based polymer" or "polyolefin" is a polymer that contains a majority amount, or greater than 50 wt %, of polymerized olefin monomer, for example, ethylene or propylene, (based on the weight of the polymer), and optionally, may contain at least one comonomer. A nonlimiting example of an olefin-based polymer is an ethylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer." Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "timing belt" is a band forming part of an internal combustion engine that synchronizes the rotation of the crankshaft and camshaft(s) so that the engine's valves open and close at the proper times during each cylinder's intake and exhaust strokes. A nonlimiting example of a timing belt is an automotive timing belt.

"Yarn" is a continuous length of twisted or otherwise entangled filaments that can be used in the manufacture of woven or knitted fabrics.

DETAILED DESCRIPTION

The present disclosure provides an article. The article includes an adhesive layer with two opposing surfaces. The adhesive layer contains (i) a functionalized ethylene-based polymer having a melt index from 0.1 g/10 min to 300 g/10 min; (ii) from 0.01 wt % to 45 wt % of a functionalized hydrocarbon; (iii) a tackifier; and (iv) optionally, a cross-linking agent. Optionally, the article includes a first layer in direct contact with a first surface of the adhesive layer, the first layer containing a fabric. Optionally, the article includes a second layer in direct contact with a second surface of the adhesive layer, the second layer containing an ethylene-based polymer selected from an ethylene/α-olefin multi-block copolymer, an ethylene/propylene/diene terpolymer, and combinations thereof.

A. Adhesive Layer

The present article includes an adhesive layer. The adhesive layer has two opposing surfaces—i.e., a first surface and a second surface. The adhesive layer contains (i) a functionalized ethylene-based polymer having a melt index from 0.1 g/10 min to 300 g/10 min; (ii) from 0.01 wt % to 45 wt % of a functionalized hydrocarbon; (iii) a tackifier; (iv) optionally, a crosslinking agent; (v) optionally, an ethylene-based polymer; (vi) optionally, a styrenic block copolymer, and (vii) optionally, an additive.

(i) Functionalized Ethylene-Based Polymer

The adhesive layer contains a functionalized ethylene-based polymer. A "functionalized ethylene-based polymer" is an ethylene-based polymer with an acid moiety, an acid anhydride moiety, an amine moiety, an imide moiety, or a hydroxyl moiety bonded to the ethylene-based polymer chain (for example, an acid anhydride moiety grafted to the ethylene-based polymer chain). Nonlimiting examples of suitable acid include carboxylic acid, such as maleic acid, fumaric acid, itaconic acid, acrylic acid, methacrylic acid, and crotonic acid. Nonlimiting examples of suitable acid anhydride include carboxylic acid anhydride, such as maleic anhydride and itaconic anhydride. Nonlimiting examples of suitable amine include primary amine, secondary amine (e.g., hydroxyethylamine), tertiary amine (e.g., trimethylamine), monoamine, diamine (e.g., 2-ethylaminoethylamine), and combinations thereof.

In an embodiment, the functionalized ethylene-based polymer is a maleic anhydride-functionalized ethylene-based polymer. In a further embodiment, the functionalized ethylene-based polymer is a maleic anhydride-grafted ethylene-based polymer.

The functionalized ethylene-based polymer is formed from an ethylene-based polymer. Nonlimiting examples of suitable ethylene-based polymer includes ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the functionalized ethylene-based polymer does not contain an aromatic comonomer polymerized therein. In an embodiment, the ethylene-based polymer is an ethylene/octene interpolymer.

In an embodiment, the functionalized ethylene-based polymer is a maleic anhydride-functionalized ethylene/α-olefin interpolymer. In a further embodiment, the functionalized ethylene/α-olefin interpolymer is a maleic anhydride-grafted ethylene/α-olefin interpolymer ("MAH-g-ethylene/α-olefin interpolymer"), or further a maleic anhydride-grafted ethylene/octene interpolymer. A nonlimiting example of a suitable MAH-g-ethylene/α-olefin interpolymer is MAH-g-ethylene/α-olefin copolymer (for example, AMPLIFY™ GR 216, available from The Dow Chemical Company).

In an embodiment, the functionalized ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt % units derived from ethylene, based on the weight of the functionalized ethylene-based polymer. In an embodiment, the functionalized ethylene-based polymer contains from greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt %, or 0.2 wt %, or 0.5 wt % to 1 wt %, or 1.5 wt %, or 2 wt %, or 2.6 wt %, or 3 wt %, or 5 wt % of the acid moiety, acid anhydride moiety, amine moiety, imide moiety, or hydroxyl moiety, based on the total weight of the functionalized ethylene-based polymer.

The functionalized ethylene-based polymer has a melt index from 0.1 g/10 min to 300 g/10 min. In an embodiment, the functionalized ethylene-based polymer has a melt index from 0.1 g/10 min, or 1 g/10 min to 1.5 g/10 min, or 2.0 g/10 min, or 3.0 g/10 min, or 5.0 g/10 min, or 6.0 g/10 min, or 8.0 g/10 min, or 10 g/10 min, or 15 g/10 min, or 20 g/10 min, or 30 g/10 min, or 40 g/10 min, or 50 g/10 min, or 100 g/10 min, or 150 g/10 min, or 200 g/10 min, or 250 g/10 min, or 300 g/10 min.

In an embodiment, the functionalized ethylene-based polymer has a density of from 0.855 g/cc, or 0.860 g/cc, or 0.865 g/cc, or 0.870 g/cc to 0.875 g/cc, or 0.880 g/cc, or 0.885 g/cc, or 0.890 g/cc, or 0.895 g/cc.

In an embodiment, the functionalized ethylene-based polymer has a melting point (Tm) from 35° C., or 40° C., or 45° C., or 50° C., or 55° C., or 60° C. to 65° C., or 70° C., or 75° C., or 80° C., or 85° C., or 90° C., or 95° C., or 100° C.

In an embodiment, the functionalized ethylene-based polymer has a glass transition temperature (Tg) of from –80° C., or –70° C., or –60° C., or –58° C., or –56° C. to –54° C., or –52° C., or –50° C., or –40° C., or –30° C., or –20° C.

In an embodiment, the functionalized ethylene-based polymer, or further the MAH-g-ethylene/α-olefin interpolymer, has a melt index from 0.1 g/10 min, or 1 g/10 min to 1.5 g/10 min, or 2.0 g/10 min, or 3.0 g/10 min, or 5.0 g/10 min, or 6.0 g/10 min, or 7.0 g/10 min, or 8.0 g/10 min, or 9.0 g/10 min, or 10 g/10 min; and the functionalized ethylene-based polymer, or further the MAH-g-ethylene/α-olefin interpolymer, has one, some, or all of the following properties: (i) at least 50 wt % units derived from ethylene; and/or (ii) from greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt %, or 0.2 wt %, or 0.5 wt % to 1 wt %, or 1.5 wt %, or 2 wt %, or 2.6 wt %, or 3 wt % of the acid anhydride moiety; and/or (iii) a density from 0.865 g/cc, or 0.870 g/cc to 0.875 g/cc, or 0.880 g/cc, or 0.885 g/cc; and/or (iv) a melting point (Tm) from 40° C., or 45° C., or 50° C., or 55° C., or 60° C. to 65° C., or 70° C.; and/or (v) a glass transition temperature (Tg) from –60° C., or –58° C., or –56° C. to –54° C., or –52° C., or –50° C., or –40° C.

In an embodiment, the functionalized ethylene-based polymer is present in the adhesive layer in an amount from 10 wt %, or 12 wt %, or 15 wt %, or 20 wt %, or 25 wt %, or 30 wt %, or 35 wt %, or 40 wt %, or 45 wt %, or 50 wt %, or 55 wt % to 60 wt %, or 65 wt %, or 70 wt %, or 75 wt %, based on total weight of the adhesive layer.

The adhesive layer may comprise more than one functionalized ethylene-based polymer.

The functionalized ethylene-based polymer may comprise two or more embodiments discussed herein.

(ii) Functionalized Hydrocarbon

The adhesive layer contains a functionalized hydrocarbon. A "functionalized hydrocarbon" is a hydrocarbon polymer with an acid anhydride moiety bonded to the hydrocarbon polymer chain (for example, an acid anhydride moiety grafted to the hydrocarbon polymer chain). Nonlimiting examples of suitable hydrocarbon polymer include polybutadiene, polyisoprene, and ethylene/propylene/diene terpolymer. (EPDM) terpolymer. Nonlimiting examples of suitable acid anhydride include carboxylic acid anhydride, such as maleic anhydride and itaconic anhydride. The functionalized hydrocarbon serves as a plasticizer in the adhesive layer.

In an embodiment, the functionalized hydrocarbon is a functionalized polybutadiene. The base polybutadiene of the functionalized polybutadiene is a polymer formed from the monomer 1,3-butadiene. In an embodiment, the base polybutadiene is a homopolymer containing 100 wt % units derived from 1,3-butadiene, based on the weight of the polybutadiene. The base polybutadiene can be cis, trans, vinyl, or a combination thereof. In an embodiment, the base polybutadiene is 1,4-cis polybutadiene. In an embodiment, the functionalized polybutadiene is a maleic anhydride-functionalized polybutadiene. In a further embodiment, the functionalized polybutadiene is a maleic anhydride-grafted polybutadiene ("MAH-g-PBD"). In a further embodiment, the MAH-g-PBD is a maleic anhydride-grafted 1,4-cis polybutadiene. Nonlimiting examples of suitable MAH-g-PBD include POLYVEST™ MA 120 and POLYVEST™ M75, each available from Evonik Industries.

In an embodiment, the functionalized polybutadiene contains greater than 50 wt % units derived from 1,3-butadiene, or from 51 wt %, or 55 wt %, or 60 wt %, or 65 wt % to 70 wt %, or 75 wt %, or 80 wt %, or 85 wt %, or 90 wt %, or 95 wt %, or 98 wt %, or 99 wt % units derived from 1,3-butadiene, based on the total weight of the functionalized polybutadiene. In an embodiment, the functionalized polybutadiene contains a reciprocal amount of the acid anhydride moiety, or from greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt %, or 0.2 wt %, or 0.5 wt % to 1 wt %, or 1.5 wt %, or 2 wt %, or 2.6 wt %, or 3 wt %, or 5 wt %, or 8 wt %, or 10 wt %, or 11 wt %, or 12 wt %, or 15 wt % of the acid anhydride moiety, based on the total weight of the functionalized polybutadiene.

In an embodiment, the functionalized hydrocarbon has an acid value from 1 mg KOH/g, or 5 mg KOH/g to 10 mg KOH/g, or 15 mg KOH/g, or 20 mg KOH/g, or 30 mg KOH/g, or 40 mg KOH/g, or 50 mg KOH/g, or 60 mg KOH/g, or 65 mg KOH/g, or 70 mg KOH/g to 90 mg KOH/g, or 100 mg KOH/g, or 110 mg KOH/g, or 120 mg KOH/g, or 130 mg KOH/g, or 140 mg KOH/g, or 150 mg KOH/g.

In an embodiment, the functionalized hydrocarbon has a pour point from –40° C., or –35° C., or –30° C., or –25° C. to –20° C., or –15° C., or –10° C., or –5° C., or –1° C., or –0.1° C., or 0° C., or 5° C., or 10° C., or 20° C.

In an embodiment, the functionalized hydrocarbon has an iodine number from 300 g $I_2$/100 g, or 350 g $I_2$/100 g, or 380 g $I_2$/100 g to 420 g $I_2$/100 g, or 450 g $I_2$/100 g, or 500 g $I_2$/100 g.

In an embodiment, the functionalized hydrocarbon has a density from 0.90 g/cc, or 0.91 g/cc, or 0.92 g/cc, or 0.93 g/cc, or 0.94 g/cc, or 0.95 g/cc to 0.96 g/cc, or 0.97 g/cc, or 0.98 g/cc, or 0.99 g/cc.

In an embodiment, the functionalized hydrocarbon has a weight average molecular weight (Mw) from 500 g/mol, or 1000 g/mol, or 1500 g/mol, or 2000 g/mol, or 2500 g/mol to 3000 g/mol, or 3200 g/mol, or 3500 g/mol, or 4000 g/mol, or 5000 g/mol, or 10000 g/mol.

In an embodiment, the functionalized polybutadiene, or further the MAH-g-PBD, or further the maleic anhydride-grafted 1,4-cis polybutadiene, has one, some, or all of the following properties: (i) greater than 50 wt % units derived from 1,3-butadiene; and/or (ii) contains from greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt %, or 0.2 wt %, or 0.5 wt % to 1 wt %, or 1.5 wt %, or 2 wt %, or 2.6 wt %, or 3 wt %, or 5 wt %, or 8 wt %, or 10 wt %, or 11 wt %, or 12 wt %, or 15 wt % of the acid anhydride moiety; and/or (iii) an acid value from 50 mg KOH/g, or 60 mg KOH/g, or 70 mg KOH/g to 90 mg KOH/g, or 100 mg KOH/g, or 110 mg KOH/g, or 120 mg KOH/g, or 130 mg KOH/g, or 140 mg KOH/g; and/or (iv) a pour point from –30° C., or –25° C. to –20° C., or –15° C., or –10° C., or –5° C., or –1° C., or –0.1° C., or 0° C., or 5° C.; and/or (v) an iodine number from 350 g $I_2$/100 g, or 380 g $I_2$/100 g to 420 g $I_2$/100 g, or 450 g $I_2$/100 g; and/or (vi) a density from 0.94 g/cc, or 0.95 g/cc to 0.96 g/cc, or 0.97 g/cc, or 0.98 g/cc; and/or (vii) a weight average molecular weight (Mw) from 2000 g/mol, or 2500 g/mol to 3000 g/mol, or 3200 g/mol, or 3500 g/mol, or 4000 g/mol.

In an embodiment, the functionalized hydrocarbon, or further the functionalized polybutadiene, is present in the adhesive layer in an amount from 0.01 wt %, or 0.05 wt %, or 0.1 wt %, or 0.5 wt %, or 1 wt %, or 5 wt %, or 10 wt %, or 15 wt % to 20 wt %, or 25 wt %, or 30 wt %, or 35 wt %, or 40 wt %, or 45 wt %, or 50 wt %, or 55 wt %, based on the total weight of the adhesive layer.

The functionalized hydrocarbon may comprise two or more embodiments discussed herein.

(iii) Tackifier

The adhesive layer contains a tackifier. The tackifier has a Ring and Ball softening point from 80° C., or 85° C., or 90° C., or 93° C., or 95° C., or 97° C., or 100° C., or 105° C. to 110° C., or 115° C., or 120° C., or 130° C., or 140° C., or 150° C. The tackifier may modify the properties of the adhesive layer such as viscoelastic properties (e.g., tan delta), rheological properties (e.g., viscosity), tackiness (e.g., ability to stick), pressure sensitivity, and wetting property. In some embodiments, the tackifier is used to improve the tackiness of the adhesive layer. In particular embodiments, the tackifier is used to wet out adherent surfaces and/or improve the adhesion to the adherent surfaces.

Tackifiers suitable for the adhesive layer disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C., or 100° C. to 130° C., or 150° C. They are also available with differing levels of hydrogenation, or saturation, which is another commonly used term. Nonlimiting examples of suitable tackifying resins include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of 140° C. Other nonlimiting examples of suitable tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifier is free of groups with which the acid anhydride-based moiety of the functionalized ethylene-based polymer will react.

In an embodiment, the tackifier has one, some, or all of the following properties: (i) a Ring and Ball softening point from 80° C., or 85° C., or 90° C., or 93° C., or 95° C., or 97° C., or 100° C., or 105° C. to 110° C., or 115° C., or 120° C., or 130° C., or 140° C., or 150° C.; and/or (ii) an acid value from 0 mg KOH/g to 1 mg KOH/g, or 5 mg KOH/g, or 10 mg KOH/g, or 15 mg KOH/g, or 20 mg KOH/g, or 50 mg KOH/g, or 100 mg KOH/g, or 150 mg KOH/g, or 170 mg KOH/g; and/or (iii) a weight average molecular weight (Mw) from 400 g/mol, or 500 g/mol, or 1000 g/mol to 1700 g/mol, or 2000 g/mol, or 2500 g/mol, or 3000 g/mol, or 3200 g/mol, or 3500 g/mol, or 4000 g/mol; and/or (iv) a number average molecular weight (Mn) from 400 g/mol, or 500 g/mol to 600 g/mol, or 700 g/mol, or 800 g/mol, or 900 g/mol, or 1000 g/mol, or 1100 g/mol; and/or (v) a glass transition temperature (Tg) from 30° C., or 35° C., or 40° C. to 45° C., or 50° C., or 55° C. In a further embodiment, the tackifier is an aliphatic hydrocarbon resin, an aliphatic and aromatic hydrocarbon resin, a polyterpene resin, hydrogenated rosin acid, or a combination thereof.

In an embodiment, the tackifier is an aliphatic and aromatic hydrocarbon resin with a Ring and Ball softening point from 90° C., or 93° C., or 105° C. to 110° C., or 115° C., or 120° C., or 130° C., or 140° C.

In an embodiment, the tackifier is present in the adhesive layer in an amount from 5 wt %, or 9 wt %, or 10 wt %, or 15 wt %, or 19 wt %, or 20 wt %, or 25 wt %, or 30 wt %, or 35 wt % to 40 wt %, or 45 wt %, or 50 wt %, or 55 wt %, based on the total weight of the adhesive layer.

The tackifier may comprise two or more embodiments discussed herein.

(iv) Crosslinking Agent

In an embodiment, the adhesive layer contains a crosslinking agent. The crosslinking agent promotes curing of the adhesive layer, and further promotes adhesion between the adhesive layer and layers in contact with the adhesive layer. A nonlimiting example of a suitable crosslinking agent is a peroxide. Nonlimiting examples of suitable peroxides include benzoyl peroxide, methyl ethyl ketone peroxide, tert-butyl peroxide, lauroyl peroxide and dicumyl peroxide. In an embodiment, the crosslinking agent is lauroyl peroxide, dicumyl peroxide, or a combination thereof.

In an embodiment, the crosslinking agent is present in the adhesive layer in an amount from 0.1 wt %, or 0.5 wt % to 1.0 wt %, or 1.5 wt %, or 2.0 wt %, or 3.0 wt %, or 4.0 wt %, or 5.0 wt %, or 6.0 wt %, or 7.0 wt %, or 8.0 wt %, or 9.0 wt %, or 10.0 wt %, based on the total weight of the adhesive layer.

The crosslinking agent may comprise two or more embodiments discussed herein.

(v) Optional Ethylene-Based Polymer

In an embodiment, the adhesive layer contains an optional ethylene-based polymer. The optional ethylene-based polymer is different than the functionalized ethylene-based polymer because the optional ethylene-based polymer is not functionalized (i.e., contains no acid anhydride moiety).

The ethylene-based polymer may be any ethylene-based polymer disclosed herein. In an embodiment, the ethylene-based polymer is an ethylene/α-olefin interpolymer. In an embodiment, the ethylene-based polymer does not contain an aromatic comonomer polymerized therein. In an embodiment, the ethylene-based polymer is an ethylene/octene copolymer.

In an embodiment, the ethylene-based polymer is an ethylene/$C_4$-$C_8$ α-olefin copolymer, or further an ethylene/1-octene copolymer, with one, some, or all of the following properties: (i) a melt index from 0.1 g/10 min, or 1 g/10 min to 1.5 g/10 min, or 2.0 g/10 min, or 5.0 g/10 min, or 6.0 g/10 min, or 10 g/10 min, or 15 g/10 min, or 20 g/10 min, or 30 g/10 min, or 40 g/10 min, or 45 g/10 min, or 50 g/10 min; and/or (ii) at least 50 wt % units derived from ethylene; and/or (iii) a density from 0.855 g/cc, or 0.859 g/cc to 0.865 g/cc, or 0.875 g/cc, or 0.880 g/cc, or 0.885 g/cc, or 0.890 g/cc, or 0.895 g/cc; and/or (iv) a melting point (Tm) from 35° C., or 40° C., or 45° C., or 50° C., or 55° C., or 60° C. to 65° C., or 70° C., or 75° C., or 80° C., or 85° C., or 90° C., or 95° C., or 100° C.; and/or (v) a glass transition temperature (Tg) from −80° C., or −70° C., or −60° C., or −58° C., or −56° C. to −54° C., or −52° C., or −50° C., or −40° C., or −30° C., or −20° C.

In an embodiment, the ethylene-based polymer is present in the adhesive layer in an amount from 1.0 wt %, or 5 wt %, or 10 wt %, or 12 wt % to 25 wt %, or 30 wt %, or 35 wt %, or 37 wt %, or 40 wt %, based on the total weight of the adhesive layer.

The ethylene-based polymer may comprise two or more embodiments discussed herein.

(vi) Optional Styrenic Block Copolymer

In an embodiment, the adhesive layer contains an optional styrenic block copolymer. A "styrenic block copolymer" is an elastomer having at least one block segment of a styrenic monomer in combination with another block segment of another comonomer. The styrene block copolymers can be of the linear or radial type, or of the diblock or triblock type. Nonlimiting examples of suitable styrenic block copolymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Styrenic block copolymers are available from Dexco Polymers under the trademark VECTOR®, from Kraton Corporation under the trademark KRATON® (e.g., KRATON® FG1901 G), and from Dynasol, under the trademark SOLPRENE® 4114A, 4213A, and the like.

In an embodiment, the styrenic block copolymer is functionalized. A functionalized styrenic block copolymer contains a functional group. Such a functional group is grafted pendant to the polymer chain. The functional group may also be incorporated through copolymerization of a suitable monomer containing the desired functional group. Examples of suitable functional groups include halo, particularly chloro and bromo, hydroxyl, carboxyl, carbonyl, phosphono, acid anhydride, amino, epoxy, mercapto, sulfate, sulfonate, amido, and ester groups. Nonlimiting examples of unsaturated carboxylic acid and acid anhydride compounds that can be grafted onto preformed styrenic block copolymer include maleic acid, fumaric acid, itaconic acid, acrylic acid, methacrylic acid, crotonic acid, maleic anhydride, and itaconic anhydride. In an embodiment, the functionalized styrenic block copolymer is a maleic anhydride-functionalized styrenic block copolymer.

In an embodiment, the styrenic block copolymer is present in the adhesive layer in an amount from 1.0 wt %, or 5 wt %, or 10 wt %, or 12 wt % to 25 wt %, or 30 wt %, or 35 wt %, or 37 wt %, or 40 wt %, based on the total weight of the adhesive layer.

The styrenic block copolymer may comprise two of more embodiments disclosed herein.

(vii) Optional Additive

In an embodiment, the adhesive layer contains an optional additive. Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, neutralizing agents, flame retardants, fluorescing agents, compatibilizers, antimicrobial agents, water, and combinations thereof.

In an embodiment, the additive is present in the adhesive layer in an amount from 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt %, based on the total weight of the adhesive layer.

The additive may comprise two of more embodiments disclosed herein.

In an embodiment, the adhesive layer is applied to another layer (such as the first layer or the second layer) as part of an adhesive composition. The adhesive composition contains (i) a functionalized ethylene-based polymer having a melt index from 0.1 g/10 min to 300 g/10 min; (ii) from 0.01 wt % to 45 wt % of a functionalized hydrocarbon (e.g., functionalized polybutadiene); (iii) a tackifier; (iv) optionally, a crosslinking agent; (v) optionally, an ethylene-based polymer; (vi) optionally, a styrenic block copolymer; (vii) optionally, an additive; and (viii) a solvent.

(viii) Solvent-Based Adhesive Composition

In an embodiment, an adhesive composition is provided. The adhesive composition includes a solvent. The solvent may be a hydrocarbon solvent, a polar solvent, and combinations thereof.

In an embodiment, the solvent is a hydrocarbon solvent. In an embodiment, the hydrocarbon solvent is selected from aromatic hydrocarbon solvents, aliphatic hydrocarbon solvents, and combinations thereof. An "aromatic hydrocarbon" is a hydrocarbon that contains one or more benzene rings. Nonlimiting examples of aromatic hydrocarbon solvents include toluene and xylene. An "aliphatic hydrocarbon" is a hydrocarbon that is an alkane, an alkene, an alkyne, or a derivative of an alkane, an alkene, or an alkyne. An aliphatic hydrocarbon excludes aromatic hydrocarbon. Nonlimiting examples of aliphatic hydrocarbon solvents include hexane, cyclohexane and methylcyclohexane.

In an embodiment, the solvent is a polar solvent. A "polar solvent" is a solvent containing a polar group. A "polar group" is any group that imparts a bond dipole moment to an otherwise essentially nonpolar molecule. Exemplary polar groups include alcohols, carbonyls, and carboxylic esters. Nonlimiting examples of polar solvents include alcohols, ketones, esters, and water. Nonlimiting examples of suitable ketones include acetone, methyl ethyl ketone and cyclohexanone. Nonlimiting examples of suitable esters include butyl acetate and ethyl acetate.

In an embodiment, the solvent is methyl cyclohexane, cyclohexanone, toluene, methyl ethyl ketone, or a combination thereof.

The solvent may comprise two or more embodiments disclosed herein.

In an embodiment, the adhesive composition is formed by mixing, under heat, the (i) functionalized ethylene-based polymer having a melt index from 0.1 g/10 min to 300 g/10 min; (ii) from 0.01 wt % to 45 wt % functionalized hydrocarbon; (iii) tackifier; (iv) optionally, crosslinking agent; (v) optionally, ethylene-based polymer; (vi) optionally, styrenic block copolymer; (vii) optionally, additive; and (viii) the solvent, to dissolve, or partially dissolve, components (i)-(vii) in the solvent.

In an embodiment, the present adhesive layer is applied to another layer (such as the first layer or the second layer) as part of the adhesive composition. Nonlimiting examples of suitable methods to apply the adhesive composition to the first layer or the second layer include drawdown, rod coating, roller coating, brushing, dipping, pouring or spraying techniques.

The adhesive composition is dried after it is applied to the first layer or the second layer to evaporate at least 90 wt %, or 98 wt %, or 99 wt %, or 100 wt % of the solvent(s), based on the weight of the solvent in the adhesive composition, to form the adhesive layer. In an embodiment, 100 wt % of the solvent is evaporated, based on the weight of the total weight of solvent in the adhesive composition. Nonlimiting examples of methods to dry the adhesive composition include drying the article in an oven at a temperature equal to or greater than 80° C. for at least 0.5 minutes, at least 1 minute, at least 2 minutes, or at least 3 minutes, or at least 4 minutes, or at least 5 minutes.

In an embodiment, the adhesive layer has a coat weight after drying from 50 g/m², or 60 g/m², or 70 g/m², or 80 g/m², or 85 g/m², or 90 g/m² to 100 g/m², or 110 g/m², or 120 g/m², or 130 g/m², or 140 g/m², or 150 g/m², or 160 g/m², or 170 g/m².

In an embodiment, the adhesive layer includes: (i) from 10 wt %, or 12 wt %, or 15 wt %, or 20 wt %, or 25 wt %, or 30 wt %, or 35 wt %, or 40 wt %, or 45 wt %, or 50 wt %, or 55 wt % to 60 wt %, or 65 wt %, or 70 wt %, or 75 wt % of an functionalized ethylene-based polymer having a melt index from 0.1 g/10 min to 50 g/10 min, or 300 g/10 min; (ii) from 0.01 wt %, or 0.05 wt %, or 0.5 wt %, or 1 wt %, or 5 wt %, or 10 wt %, or 15 wt % to 20 wt %, or 25 wt %, or 30 wt %, or 35 wt %, or 40 wt %, or 45 wt % of a functionalized hydrocarbon (e.g., functionalized polybutadiene); (iii) from 5 wt %, or 9 wt %, or 10 wt %, or 15 wt %, or 20 wt %, or 25 wt %, or 30 wt %, or 35 wt % to 40 wt %, or 45 wt %, or 50 wt %, or 55 wt % of a tackifier; (iv) optionally, from 0 wt %, or 0.1 wt %, or 0.5 wt % to 1.0 wt %, or 1.5 wt %, or 2.0 wt %, or 3.0 wt %, or 4.0 wt %, or 5.0 wt %, or 6.0 wt %, or 7.0 wt %, or 8.0 wt %, or 9.0 wt %, or 10.0 wt % of a crosslinking agent; (v) optionally, from 0 wt %, or 1.0 wt %, or 5 wt %, or 10 wt %, or 12 wt % to 25 wt %, or 30 wt %, or 35 wt %, or 37 wt %, or 40 wt % of an ethylene-based polymer; (vi) optionally, from 0 wt %, or 1.0 wt %, or 5 wt %, or 10 wt %, or 12 wt % to 25 wt %, or 30 wt %, or 35 wt %, or 37 wt %, or 40 wt % of a styrenic block copolymer; and (vii) optionally, from 0 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % of an additive, based on the total weight of the adhesive layer.

The adhesive layer and the adhesive composition may comprise two or more embodiments disclosed herein.

B. First Layer

In an embodiment, the present article includes a first layer in direct contact with a first surface of the adhesive layer. The first layer includes a fabric. In an embodiment, the fabric is formed from individual fibers or yarn that are polyester, polyamide (such as nylon), cellulose, fiberglass, para-aramid, aramid, or a combination thereof. A nonlimiting example of a suitable polyester is polyethylene terephthalate (PET). A nonlimiting example of a suitable cellulose is cotton. In an embodiment, the fabric includes PET fibers and cotton fibers. In an embodiment, from 50 wt %, or 51 wt %, or 75 wt % to 90 wt %, 100 wt % of the fabric fibers and/or the fabric yarn are polyester, polyamide, cellulose, fiberglass, para-aramid, aramid, or a combination thereof.

The fabric may be woven or non-woven (such as knitted). In an embodiment, the fabric is a knitted fabric. A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

In an embodiment, the fabric has a thickness from 20 μm, or 50 μm, or 100 μm, or 200 μm, or 300 μm, or 400 μm to 500 μm, or 900 μm, or 1000 μm, or 1500 μm, or 2000 μm, or 3000 μm.

The first layer, and further the fabric, may comprise two or more embodiments disclosed herein.

C. Second Layer

In an embodiment, the present article includes a second layer in direct contact with a second surface of the adhesive layer. The second layer contains an ethylene-based polymer selected from (1) an ethylene/α-olefin multi-block copolymer, (2) an ethylene/propylene/diene terpolymer, and combinations thereof. In an embodiment, the second layer includes (3) an optional additive.

(1) Ethylene/α-Olefin Multi-Block Copolymer

In an embodiment, the second layer includes an ethylene/α-olefin multi-block copolymer. The term "ethylene/α-olefin multi-block copolymer" refers to an ethylene/C4-C8 α-olefin multi-block copolymer consisting of ethylene and one copolymerizable C4-C8 α-olefin comonomer in polymerized form, the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The C4-C8 α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 mol % of the whole ethylene/α-olefin multi-block copolymer. More preferably, ethylene comprises at least 60 mol %, at least 70 mol %, or at least 80 mol %, with the substantial remainder of the whole ethylene/α-olefin multi-block copolymer comprising the $C_4$-$C_8$ α-olefin comonomer. In an embodiment, the ethylene/α-olefin multi-block copolymer contains 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mol % of the whole ethylene/octene multi-block copolymer and an octene content of from 10 to 15 mol %, or from 15 to 20 mol % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608, 668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, ethylene/α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,\ \text{and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299\ \Delta H + 62.81\ \text{for}\ \Delta H\ \text{greater than zero and up to 130 J/g}$$

$$\Delta T \geq 48°\ \text{C. for}\ \Delta H\ \text{greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re \gg 1481 - 1629(d);\ \text{and/or}$$

(D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/α-olefin multi-block copolymer has hard segments and soft segments, is styrene-free, consists of only (i) ethylene and (ii) a $C_4$-$C_8$ α-olefin, and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc, or 0.875 g/cc to 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (1) a Mw/Mn from 1.7, or 1.8 to 2.2, or 2.5, or 3.5; and/or (2) a density from 0.860 g/cc, or 0.865 g/cc to 0.870 g/cc, or 0.880 g/cc; and/or (3) a melting point, Tm, from 110° C., or 115° C. to 125° C., or 130° C., or 135° C.; and/or (4) a melt index (MI) from 0.1 g/10 min, or 0.5 g/10 min to 1.0 g/10 min, or 2.0 g/10 min, or 5 g/10 min, or 10 g/10 min; and/or (5) 50-85 wt % soft segment and 40-15 wt % hard segment; and/or (6) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (7) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (8) an elastic recovery (Re) from 50%, or 60% to 70%, or 80%, or 90%, at 300% 300% $min^{-1}$ deformation rate at 21° C. as measured in accordance with ASTM D 1708; and/or (9) a polydisperse distribution of blocks and a polydisperse distribution of block sizes.

In an embodiment, the ethylene/α-olefin multi-block copolymer is an ethylene/octene multi-block copolymer. In an embodiment, the ethylene/octene multi-block copolymer is sold under the tradename INFUSE™, available from The Dow Chemical Company, Midland, Michigan, USA.

The ethylene/α-olefin multi-block copolymers can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893, 166; and 7,947,793.

The second layer may comprise more than one ethylene/α-olefin multi-block copolymer.

In an embodiment, the second layer contains from 10 wt %, or 20 wt %, or 25 wt %, or 30 wt % to 35 wt %, or 40 wt %, or 45 wt %, or 50 wt %, or 60 wt %, or 70 wt %, or 80 wt %, or 90 wt %, or 100 wt % ethylene/α-olefin multi-block copolymer, based on the total weight of the second layer.

The ethylene/α-olefin multi-block copolymer may comprise two or more embodiments disclosed herein.

(2) Ethylene/Propylene/Diene Terpolymer

In an embodiment, the second layer includes an ethylene/propylene/diene terpolymer. An "ethylene/propylene/diene terpolymer" ("EPDM") is a polymer with a majority weight percent (i.e., greater than 50 wt %) of units derived from ethylene, and also includes units derived from propylene comonomer, and units derived from a diene comonomer.

The EPDM terpolymer includes units derived from a diene monomer. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene, 3,7-dimethyl-1,6-octadiene, 3,7-dimethyl-1,7-octadiene and mixed isomers of dihydromyricene and dihydroocinene; single ring alicyclic dienes, such as 1,3-cyclopentadiene, 1,4-cyclohexadiene, 1,5-cyclooctadiene and 1,5-cyclododecadiene; and multi-ring alicyclic fused and bridged ring dienes, such as tetrahydroindene, methyl tetrahydroindene, dicyclopentadiene, and bicyclo-(2,2,1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 5-ethylidene-2-norbornene (ENB), 5-vinylidene-2-norbornene (VNB), 5-methylene-2-norbornene (MNB), dicyclopentadiene (DCPD); and combinations thereof. Further nonlimiting examples of suitable diene include 4-methyl-1,4-hexadiene, 7-methyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,8-nonadiene, 1,9-decadiene, 1,10-undecadiene, 1,5-cyclododecadiene, bicyclo[2.2.1]hepta-2,5-diene (norbornadiene), tetracyclododecene, butadiene, dicyclopentadiene, vinyl norbornene, mixed isomers of dihydromyricene and dihydroocinene, tetrahydroindene, methyl tetrahydroindene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and combinations thereof. A nonlimiting example of a suitable EPDM terpolymer is NORDEL™ IP 3760P, available from The Dow Chemical Company.

The second layer may comprise more than one EPDM terpolymer.

In an embodiment, the second layer contains from 20 wt %, or 25 wt %, or 30 wt % to 35 wt %, or 40 wt %, or 45 wt %, or 50 wt %, or 60 wt %, or 70 wt %, or 80 wt %, or 90 wt % EPDM terpolymer, based on the total weight of the second layer.

The EPDM terpolymer may comprise two or more embodiments disclosed herein.

(3) Optional Additive

In an embodiment, the second layer includes an optional additive. Nonlimiting examples of suitable additives include filler (e.g., carbon black and silica), plasticizers, oils (e.g., paraffinic oil), stabilizers, antioxidants (e.g., zinc 2-mercaptotolumindazole, 4,4'-bis(alpha,alpha-dimethylbenxyl)diphenylamine, and polymerized 1,2-dihydro-2,2,4-trimethylquinoline), pigments, dyestuffs, anti block additives, polymeric additives, defoamers, preservatives, thickeners, rheology modifiers, humectants, fillers, solvents, nucleating agents, surfactants, chelating agents, gelling agents, processing aids, neutralizing agents, flame retardants, fluorescing agents, compatibilizers, antimicrobial agents, coagents (e.g., trimethylolpropane trimethacrylate (TMPTMA)), crosslinking agents (e.g., dicumyl peroxide), water, and combinations thereof.

In an embodiment, the second layer contains: (1) from 0 wt %, or 30 wt %, or 35 wt %, or 40 wt %, or 45 wt % to 50 wt %, or 55 wt %, or 60 wt % ethylene/α-olefin multi-block copolymer; (2) from 0 wt %, or 20 wt %, or 25 wt %, or 30 wt % to 35 wt %, or 40 wt %, or 45 wt %, or 50 wt % EPDM terpolymer; (3) from 0 wt %, or 30 wt %, or 40 wt %, or 45 wt % to 50 wt %, or 55 wt %, or 60 wt %, or 65 wt %, or 70 wt %, or 75 wt %, or 80 wt % filler; (4) from 0 wt %, or 5 wt %, or 6 wt % to 10 wt %, or 15 wt %, or 20 wt %, or 25 wt % oil; (5) from 0 wt %, or 0.1 wt %, or 0.5 wt %, or 1.0 wt %, or 2.0 wt % to 2.3 wt %, or 2.5 wt %, or 3.0 wt % crosslinking agent; (6) from 0 wt %, or 0.1 wt %, or 0.5 wt %, or 1.0 wt %, or 1.2 wt % to 1.4 wt %, or 1.5 wt %, or 2.0 wt % coagent; and (7) from 0 wt %, or 0.1 wt %, or 0.5 wt %, or 1.0 wt %, or 1.5 wt % to 2.0 wt %, or 2.5 wt %, or 3.0 wt % antioxidant, based on the total weight of the second layer.

The second layer may comprise two or more embodiments disclosed herein.

It is understood that the sum of the components in each of the compositions and layers disclosed herein, including the foregoing layers, yields 100 weight percent (wt %).

D. Article

The present disclosure provides an article. In an embodiment, the article includes: (A) an adhesive layer having two opposing surfaces; (B) optionally, a first layer in direct contact with a first surface of the adhesive layer, the first layer containing a fabric; and (C) optionally, a second layer in direct contact with a second surface of the adhesive layer, the second layer containing an ethylene-based polymer selected from an ethylene/α-olefin multi-block copolymer, an EPDM terpolymer, and combinations thereof. In an embodiment, the adhesive layer is crosslinked to the first layer and/or the second layer.

In an embodiment, the adhesive layer is applied to the first layer as part of an adhesive composition, and then dried to form the adhesive layer of an article with the following structure: first layer/adhesive layer.

In an embodiment, the second layer is applied to the second surface of the adhesive layer. In an embodiment, the second layer is applied to the second surface of the adhesive layer to form a laminate article with the following structure: first layer/adhesive layer/second layer (hereinafter, "Structure 1").

In an embodiment, Structure 1 is then compressed at a temperature from 20° C., or 30° C., or 40° C., or 50° C., or 60° C. to 70° C., or 80° C., and a pressure from 0 MPa, or 0.1 MPa, or 0.2 MPa to 0.3 MPa, or 0.4 MPa, or 0.5 MPa, for a period of from 1 second to 2 seconds, or 5 seconds (hereinafter, the "initial compression"). The initial compression is performed via roller processing. After the initial compression, at least a portion of the adhesive layer is crosslinked to the first layer and/or the second layer. In an embodiment, after the initial compression, the article has a peel strength from 10 g/cm, or 20 g/cm, or 30 g/cm, or 40 g/cm, or 50 g/cm, or 60 g/cm, or 70 g/cm, or 80 g/cm, or 90 g/cm, or 100 g/cm, or 110 g/cm, or 120 g/cm, or 130 g/cm, or 140 g/cm to 150 g/cm, or 160 g/cm, or 170 g/cm, or 180 g/cm, or 190 g/cm, or 200 g/cm, or 300 g/cm, or 400 g/cm, or 500 g/cm. A higher peel strength following initial compression is advantageous because it prevents the article layers from separating from one another during transfer to a high temperature curing oven.

In an embodiment, after Structure 1 undergoes initial compression, it is compressed at a temperature from 130° C., or 140° C., or 150° C., or 160° C., or 170° C. to 180° C., or 190° C., and a pressure from 0.1 MPa, or 0.5 MPa, or 0.6 MPa to 0.7 MPa, or 0.8 MPa, or 1.0 MPa, or 1.5 MPa, or 1.8 MPa, for a period of from 2 minutes, or 5 minutes, or 10 minutes to 15 minutes, or 20 minutes, or 25 minutes (hereinafter, the "final compression"). In an embodiment, the final compression is performed using a compression molder. In an embodiment, after the final compression, at least a portion of the adhesive layer is crosslinked to the first layer and/or the second layer. In an embodiment, after the final compression, the article has a peel strength from 450 g/cm, or 500 g/cm, or 750 g/cm, or 1000 g/cm, or 1100 g/cm, or 1200 g/cm, or 1300 g/cm, or 1400 g/cm, or 1500 g/cm, or 1600 g/cm, or 1700 g/cm, or 1800 g/cm, or 1900 g/cm, or 2000 g/cm, or 2500 g/cm, or 3000 g/cm, or 3500 g/cm to 4000 g/cm, or 5000 g/cm, or 5500 g/cm, or 6000 g/cm. A higher peel strength following final compression is advantageous because it prevents the article layers from separating from one another during use of said article.

Nonlimiting examples of suitable articles include timing belts (e.g., automotive timing belts); conveyor belts; coated fabrics; textile architectures such as banners and tents; reinforced tubing; multi-layer packaging films; and wire and cable applications. In an embodiment, the article is a timing belt.

In an embodiment, the article is an automotive timing belt. In an embodiment, the article includes: (A) an adhesive layer having two opposing surface, the adhesive layer containing (i) a functionalized ethylene-based polymer having a melt index from 0.1 g/10 min to 300 g/10 min; (ii) from 0.01 wt % to 45 wt % of a functionalized hydrocarbon (e.g., functionalized polybutadiene); (iii) a tackifier; (iv) optionally, a crosslinking agent; (v) optionally, an ethylene-based polymer; (vi) optionally, a styrenic block copolymer, and (vii) optionally, an additive; (B) a first layer in direct contact with a first surface of the adhesive layer, the first layer containing a fabric (e.g., a fabric with PET fiber and cotton fiber); (C) a second layer in direct contact with a second surface of the adhesive layer, the second layer containing an ethylene-based polymer selected from (1) an ethylene/α-olefin multi-block copolymer, (2) an ethylene/propylene/diene terpolymer, and combinations thereof; and an optional additive; and the article has one, some, or all of the following properties: (a) a peel strength after initial compression from 10 g/cm, or 20 g/cm, or 30 g/cm, or 40 g/cm, or 50 g/cm, or 60 g/cm, or 70 g/cm, or 80 g/cm, or 90 g/cm, or 100 g/cm, or 110 g/cm, or 120 g/cm, or 130 g/cm, or 140 g/cm to 150 g/cm, or 160 g/cm, or 170 g/cm, or 180 g/cm, or 190 g/cm, or 200 g/cm, or 300 g/cm, or 400 g/cm, or 500 g/cm; and/or (b) a peel strength after final compression from 450 g/cm, or 500 g/cm, or 750 g/cm, or 1000 g/cm, or 1100 g/cm, or 1200 g/cm, or 1300 g/cm, or 1400 g/cm, or 1500 g/cm, or 1600 g/cm, or 1700 g/cm, or 1800 g/cm, or 1900 g/cm, or 2000 g/cm, or 2500 g/cm, or 3000 g/cm, or 3500 g/cm to 4000 g/cm, or 5000 g/cm, or 5500 g/cm, or 6000 g/cm; and/or (c) a thickness from 0.5 mm, or 1.0 mm to 1.5 mm, or 2.0 mm, or 2.5 mm, or 3.0 mm, or 4.0 mm, or 5.0 mm, or 10 mm, or 20 mm, or 30 mm, or 40 mm, or 50 mm; and/or (d) the adhesive layer is crosslinked to the first layer; and/or (e) the adhesive layer is crosslinked to the second layer.

The article may comprise two or more embodiments disclosed herein.

Test Methods

Acid value (or acid number) is measured in accordance with ASTM D 1386/7. Acid value is a measure of the amount of unreacted fatty acid present in a substance. The acid value is the number of milligrams of potassium hydroxide required for the neutralization of free fatty acids present in one gram of a substance (e.g., the functionalized polybutadiene). Units for acid value are mg KOH/g.

Coat weight is measured by weighing the dried coated fabric using an analytical balance in grams, and determining the difference between the weight of the fabric and the weight of the dried coated fabric. Then, the coat weight is calculated by dividing the measured weight difference by the areas and the result is reported in grams per square meter $(g/m^2)$.

Density is measured in accordance with ASTM D792, Method B. The result is recorded in grams (g) per cubic centimeter $(g/cc$ or $g/cm^3)$.

The "iodine number" is the mass of iodine in grams that is consumed by 100 grams KOH. Iodine number is an indication of the degree of hydrogenation and is determined in accordance with German Einheitsmethode DGF C-V 11a (53) $(g \, l_2/100 \, g)$.

Melt index (MI) $(l_2)$ is measured according to ASTM D1238, Condition 190° C./2.16 kilogram (kg) weight, and is reported in grams eluted per 10 minutes (g/10 min).

Peel Strength is measured via the T-Peel Test, as described below in the Examples Section.

The "pour point" is the lowest temperature at which a liquid becomes semi-solid and loses its flow characteristics, or in other words, the minimum temperature at which a liquid will flow. Pour point is measured in accordance with ASTM D 97.

Ring and Ball softening point is measured using a Mettler Toledo FP900 Thermosystem according to ASTM E28.

Differential Scanning Calorimetry.

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The value determined is extrapolated onset of melting, Tm.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity was half-way between these baselines is the Tg.

Gel Permeation Chromatography (GPC).

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µl. A "2 mg/mL" sample concentration is prepared by dissolving the sample in N2 purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-82 (1984)) and polystyrene (E. P. Otocka, R. J. Roe, N. Y. Hellman, & P. M. Muglia, Macromolecules, 4, 507 (1971)):

$$M_{PP} = \left( \frac{K_{PS} M_{PS}^{\alpha_{PS}+1}}{K_{PP}} \right)^{\frac{1}{\alpha_{PP}+1}},$$ (Eq 1)

where Mpp is PP equivalent MW, MPS is PS equivalent MW, log K and a values of Mark-Houwink coefficients for PP and PS are listed below.

| Polymer | α | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average (Mn) and weight average (Mw) molecular weights are calculated according to the following equations:

$$M_n = \frac{\sum^i Wf_i}{\sum^i (Wf_i / M_i)},$$ (Eq 2)

$$M_w = \frac{\sum^i (Wf_i * M_i)}{\sum^i (Wf_i)},$$ (Eq 3)

where $Wf_i$ and $M_i$ are the weight fraction and molecular weight of elution component i, respectively.

The mass detector constant, laser light scattering detector constant and viscometer detector constant are determined using a standard reference (reference polymer is a linear polyethylene homopolymer) with a known value of weight average molecular weight (Mw=120,000 g/mol; do/dc=−0.104 mL/g; MWD=2.9) and intrinsic viscosity (1.873 dL/g). The chromatographic concentrations are assumed low enough to eliminate addressing second Virial coefficient effects (concentration effects on molecular weight).

The Systematic Approach for the determination of detector offset is implemented in a manner consistent with that published by Balke & Mourey et. al. (Mourey & Balke, Chromatography Polym. Chpt 12, (1992)) (Balke, Thitiratsakul, Lew, Cheung & Mourey, Chromatography Polym. Chpt 13, (1992)), using data obtained from the two detectors, while analyzing a standard reference (a linear polyethylene homopolymer) with a known value of weight average molecular weight (Mw=120,000 g/mol; do/dc=−0.104 mL/g; MWD=2.9) and intrinsic viscosity (1.873 dL/g) and narrow polystyrene standards. The Systematic Approach is used to optimize each detector offset to give molecular weight results as close as possible to those observed using the conventional GPC method.

Some embodiments of the present disclosure will now be described in detail in the following Examples.

EXAMPLES

Materials used to produce the articles are provided in Table 1 below.

TABLE 1

Starting materials.

| Component | Specification | Source |
|---|---|---|
| AMPLIFY ™ GR216 (MAH-g-E/O) | maleic anhydride grafted ethylene/octene copolymer; maleic anhydride content = 1.0 wt %; melt index = 1.3 g/10 min (190° C./2.16 kg); melting point = 63° C.; density = 0.875 g/cc; glass transition temperature = −54° C. | The Dow Chemical Company |
| AFFINITY ™ GA1000R (MAH-g-E/O) | maleic anhydride grafted ethylene/1-octene copolymer; maleic anhydride content = 1.0 wt %; melt index = 660 g/10 min (190° C./2.16 kg); melting point = 68° C.; density = 0.878 g/cc; glass transition temperature = −58° C. | The Dow Chemical Company |
| ENGAGE ™ 8842 (E/O) | ethylene/1-octene copolymer; melt index = 1 g/10 min (190° C./2.16 kg); melting point = 38° C.; density = 0.859 g/cc; glass transition temperature = −58° C. | The Dow Chemical Company |
| MAH-g-E/O 1 | maleic anhydride grafted ethylene/1-octene copolymer maleic anhydride content = 2.4-2.6 wt %; melt index = 1.1 g/10 min (190° C./2.16 kg); melting point = 40° C.; density = 0.86 g/cc; glass transition temperature = −56° C. | The Dow Chemical Company |
| ENGAGE ™ 8200 (E/O) | ethylene/1-octene copolymer; melt index = 5 g/10 min (190° C./2.16 kg); melting point = 59° C.; density = 0.870 g/cc; glass transition temperature = −53° C. | The Dow Chemical Company |

TABLE 1-continued

Starting materials.

| Component | Specification | Source |
|---|---|---|
| MAH-g-E/O 2 | maleic anhydride grafted ethylene/1-octene copolymer; maleic anhydride content = 2.6 wt %; melt index = 1.7 g/10 min (190° C./2.16 kg); melting point = 65° C.; density = 0.87 g/cc; glass transition temperature = −52° C. | The Dow Chemical Company |
| ELVAX ™ 4260 (EVA/MAA) | ethylene-vinyl acetate/acid terpolymer; vinyl acetate content = 28 wt %; methacrylic acid content = 1 wt %; melt index = 6 g/10 min (190° C./2.16 kg); melting point = 72° C.; density = 0.955 g/cc | DuPont |
| BYNEL ™ 2002 (AM-E/A) | acid modified ethylene/acrylate copolymer; acid value = 60 mg KOH/g; melt index = 10 g/10 min (190° C./2.16 kg); melting point = 91° C.; density = 0.930 g/cc | DuPont |
| LOTADER ™ AX8920 (EMA/GMA) | ethylene/methyl acrylate/glycidyl methacrylate random terpolymer; methyl acrylate content = 24-26 wt %; glycidyl methacrylate content = 2.8-3.4 wt %; melt index = 5.5-7.5 g/10 min (190° C./2.16 kg); melting point = 65° C.; density = 0.94 g/cc | Arkema |
| POLYVEST ™ MA 120 (MAH-g-PBD) | maleic anhydride grafted 1,4-cis polybutadiene; maleic anhydride content = 11 wt %; Mw = 3,200 g/mol; acid value = 130 mg KOH/g; iodine number = 380-420 g I$_2$/100 g; pour point = −1° C.; density = 0.97 g/cc | Evonik Industries |
| POLYVEST ™ M75 (MAH-g-PBD) | maleic anhydride grafted 1,4-cis polybutadiene; Mw = 3,000 g/mol; acid value = 70-90 mg KOH/g; iodine number = 380-420 g I$_2$/100 g; pour point = −25° C.; density = 0.95 g/cc | Evonik Industries |
| Mineral Oil | mixture of higher alkanes including alkanes based on n-alkanes, naphthenic oils based on cycloalkanes, and aromatic oils based on aromatic hydrocarbons | |
| Rosin S 202 | Blend of esterified, hydrogenated rosin acids; acid value = <15 mg KOH/g; softening point = 90° C. | Hualin Chemical Co., Ltd |
| PICOTAC ™ 1095 | aliphatic hydrocarbon resin; Mw = 1,700 g/mol; acid value = <1 mg KOH/g; Mn = 800 g/mol; softening point = 94° C.; glass transition temperature = 43° C. | Eastman |
| PICOTAC ™ 9105 | aliphatic/aromatic hydrocarbon resin; Mw = 3,200 g/mol; acid value = <1 mg KOH/g; Mn = 1,000 g/mol; softening point = 105° C.; glass transition temperature = 52° C. | Eastman |
| PICOTAC ™ 9095 | aliphatic/aromatic hydrocarbon resin; Mw = 1,900 g/mol; acid value = <1 mg KOH/g; Mn = 850 g/mol; softening point = 94° C.; glass transition temperature = 42° C. | Eastman |
| REGALREZ ™ 1094 | aliphatic hydrocarbon resin; Mw = 850 g/mol; Mn = 550 g/mol; softening point = 95° C.; glass transition temperature = 40° C. | Eastman |
| REGALITE ™ 1090 | aliphatic hydrocarbon resin; Mw = 700 g/mol; Mn = 500 g/mol; softening point = 88° C. | Eastman |
| PICCOLYTE ™ F105 IG | polyterpene resin; acid value = <5 mg KOH/g; softening point = 102-108° C. | Pinova, Inc. |
| FLORAL ™ AX-E | fully hydrogenated rosin acid; acid value = 165 mg KOH/g; softening point = 80° C. | Eastman |
| Solvent A | Mixture of 90 wt % methylcyclohexane and 10 wt % cyclohexanone, based on total weight of Solvent A | |
| Solvent B | Mixture of 40 wt % toluene, 50 wt % methylcyclohexane, and 10 wt % methyl ethyl ketone, based on total weight of Solvent B | |

1. Preparation of Adhesive Compositions

Ethylene-based polymer stock solutions containing 10 wt % ethylene-based polymer (based on the total weight of the ethylene-based polymer stock solution) are prepared by directly dispersing ethylene-based polymer pellets in a solvent at 85° C. under magnetic stirring, and stirred for an additional 2 hours. Tackifier stock solutions containing 20 wt % tackifier (based on the total weight of the tackifier stock solution) are prepared by directly dissolving tackifier in a solvent at 60° C. under magnetic stirring. For CS 28, the solvent is Solvent B. For all other examples and comparative samples, the solvent is Solvent A.

Adhesive compositions are prepared by mixing the ethylene-based polymer stock solution, the tackifier stock solution, plasticizers, and crosslinking agent at the desired weight ratios. The adhesive compositions are stirred at room temperature (23° C.) for 10 minutes, followed by heating at 80° C.-85° C. under magnetic stirring for another 10 minutes.

2. Preparation of First Layer/Adhesive Layer Article

A fabric roll containing PET fiber and cotton fiber ("PET-Cotton Fabric") is cut into two different sized strips: 15.24 cm×2.54 cm strips, and 15.24 cm×15.24 cm strips (length× width). The adhesive composition is applied to a surface of each strip using a brush for the 15.24 cm×2.54 cm strips and a draw-down bar for the 15.24 cm×15.24 cm strips. In each case, 12.7 cm of the length of the strip is coated with the adhesive composition. Only one side of the PET-Cotton Fabric is coated. The coated PET-Cotton Fabric strips are dried in an oven at 80° C. for 5 minutes to form an adhesive layer on the PET fabric (a PET-Cotton Fabric/adhesive layer structure). The coat weight is measured. If necessary, the process is repeated to achieve the desired coat weight. The 15.24 cm×15.24 cm structures are cut into 15.24 cm×2.54 cm structures. A control sample (CS 18) is prepared without an adhesive composition on the PET-Cotton Fabric.

The coat weight of each Inventive Example and Comparative Sample adhesive layer (dried adhesive composition) applied to the PET fabric is provided in Tables 2-4. The composition of each Example and Comparative Sample adhesive layer is provided in Tables 2-4.

3. PET-Cotton Fabric/Adhesive Layer/OBC Layer Article

INFUSE™ 9007 ethylene/1-octene multi-block copolymer ("OBC")(density=0.866 g/cc; melt index=0.5 g/10 min (190° C./2.16 kg); melting point=119° C.; Mw=>10,000 g/mol; from The Dow Chemical Company)(46.08 wt %); N-330 carbon black (32.26 wt %); Hi-Sil™ 210 silica (from PPG Industries, Inc.)(9.22 wt %); SR-350 coagent (TMPTMA, from Sartomer Company) (1.38 wt %); SUN-PAR™ 2280 paraffinic oil (from HollyFrontier Refining & Marketing LLC)(6.91 wt %); LUPEROX™ DC40P-SP2 crosslinking agent (dicumyl peroxide, from Arkema)(2.30 wt %); AGERITE™ RESIN D antioxidant (polymerized 1,2-dihydro-2,2,4-trimethylquinoline, from Vanderbilt Chemicals, LLC) (0.46 wt %); VANOX™ ZMTI antioxidant (zinc 2-mercaptotolumindazole, from Vanderbilt Chemicals, LLC)(0.92 wt %); and VANOX™ CDPA antioxidant (4,4'-bis(alpha,alpha-dimethylbenzyl)diphenylamine, from Vanderbilt Chemicals, LLC)(0.46 wt %) are weighed into an extruder, and blended in the extruder to form an OBC composition. The OBC composition is extruded and cut into 15.24 cm×2.54 cm strips.

The OBC strips are contacted with the surface of the adhesive layer in the PET-Cotton Fabric/adhesive layer structures prepared as described above. An article with the following structure is formed: PET-Cotton Fabric/adhesive layer/OBC layer.

4. Initial Compression and Adhesion Testing—T-Peel Test

Initial Compression.

The PET-Cotton Fabric/adhesive layer/OBC layer article is pre-heated to 80° for 2 minutes and compressed twice using a 2.6 kg roller. For Examples 1-27 and Comparative Samples 2-28, the initial compression profile is as follows: temperature=80° C.; pressure=0.1-0.2 MPa; time=2-4 seconds. For Examples 29-40 and Comparative Sample 33, the initial compression profile is as follows: temperature=70° C.; pressure=0.1-0.2 MPa; time=2-4 seconds. After initial compression, the samples are aged for at least 5 hours at 23° C. and a relative humidity of 40% to 50%.

Adhesion Testing.

A TA XT Plus Texture Analyzer from Texture Technologies Corp. is used to peel apart PET-Cotton Fabric and the OBC layer at room temperature (23° C.), at speed of 5.08 cm/min, and peeling distance of 7.62 cm. The average peel strength (g/cm) is determined from the grams-force versus distance profile. Two or three test samples are tested and the mean peel strength is reported. The adhesion between the PET-Cotton Fabric and the OBC layer with various adhesive layers located between the PET-Cotton Fabric and OBC layer is provided in Tables 2-4.

5. Final Compression and Adhesion Testing—T-Peel Test

Final Compression. Following initial compression adhesion testing, the separated PET-Cotton Fabric/adhesive layer/OBC layer articles are re-adhered at 80° C. following the above initial compression procedure. Then, for Examples 1-17 and Comparative Samples 2-18, one PET-Cotton Fabric/adhesive layer/OBC layer article sample is placed in an oven at 180° C. for 20 minutes (with no pressure). Also for Examples 1-17 and Comparative Samples 2-18, one PET-Cotton Fabric/adhesive layer/OBC layer article sample is pre-heated to 130° C. for 2 minutes and compressed using a compression molder with the following final compression profile: temperature=130° C.; pressure=1.5 MPa; time=2 minutes. For Examples 21-25 and Comparative Samples 19-28, PET-Cotton Fabric/adhesive layer/OBC layer article samples are pre-heated to 130° C. for 2 minutes and compressed using a compression molder with the following final compression profile: temperature=130° C.; pressure=1.5 MPa; time=2 minutes. For Examples 29-40 and Comparative Sample 33, PET-Cotton Fabric/adhesive layer/OBC layer article samples are pre-heated to 180° C. for 2 minutes and compressed using a compression molder with the following final compression profile: temperature=180° C.; pressure=0.689 MPa; time=2 minutes. The samples are aged for at least 5 hours at 23° C. and a relative humidity of 40% to 50%.

Adhesion Testing.

A TA XT Plus Texture Analyzer from Texture Technologies Corp. is used to peel apart PET-Cotton Fabric and the OBC layer at room temperature (23° C.), at speed of 5.08 cm/min, and peeling distance of 20.32 cm. The average peel strength (g/cm) is determined from the grams-force versus distance profile. Two or three test samples are tested and the mean peel strength is reported. The adhesion between the PET-Cotton Fabric and the OBC layer with various adhesive layers located between the PET-Cotton Fabric and OBC layer is provided in Tables 2-4.

In Tables 2-4, the adhesive layers denoted with the letter "A" and the PET-Cotton Fabric/Adhesive Layer/OBC Layer articles are denoted with the letter "B." By way of explanation, PET-Cotton Fabric/Adhesive Layer/OBC Layer "1B" contains adhesive layer "1A"—thus, Ex. 1 constitutes "1A" and "1B".

6. Results and Discussion

As shown, articles formed from (A) an adhesive layer containing a MAH-g-ethylene/1-octene copolymer with a melt index of 0.1-300 g/10 min, 0.01-45 wt % of a MAH-g-polybutadiene, a tackifier, and a crosslinking agent; (B) a PET-Cotton Fabric, and (C) an OBC layer (Ex. 1-40) advantageously exhibit both (i) a peel strength after initial compression that is greater than 10 g/cm and (ii) a peel strength after final compression that is greater than 450 g/cm. Consequently, Ex. 1-40 would be suitable for use as automotive timing belts.

In contrast, an article formed from (A) an adhesive layer containing a MAH-g-ethylene/1-octene copolymer with a melt index of greater than 300 g/10 min (AFFINITY™ GA1000R with a melt index of 660 g/10 min), 0.01-45 wt % of a MAH-g-polybutadiene, a tackifier, and a crosslinking agent; (B) a PET-Cotton Fabric, and (C) an OBC layer (CS 8) exhibits a low peel strength after initial compression of 0 g/cm. Consequently, CS 8 would not be suitable for use as automotive timing belts.

Additionally, articles formed from (A) an adhesive layer containing non-functionalized ethylene/1-octene copolymer with a melt index of 0.1-50 g/10 min, 0.01-45 wt % of a MAH-g-polybutadiene, a tackifier, and a crosslinking agent; (B) a PET-Cotton Fabric, and (C) an OBC layer (CS 7-11) exhibit (i) a low peel strength after initial compression (0-8.66 g/cm). Consequently, CS 7-11 would not be suitable for use as automotive timing belts.

TABLE 2

| Adhesive Layers and Articles◇ | | | | | | | | |
|---|---|---|---|---|---|---|---|---|
| Ex 1 | CS 2 | Ex 3 | Ex 4 | CS 5 | Ex 6 | CS 7 | CS 8 | CS 9 |
| Adhesive Layer | | | | | | | | |
| 1A | 2A | 3A | 4A | 5A | 6A | 7A | 8A | 9A |

| Ethylene-Based Polymer | | | | | | | | | |
|---|---|---|---|---|---|---|---|---|---|
| AMPLIFY ™ GR216 (MAH-g-E/O) | 59.4 | 49.5 | 59.4 | — | — | — | — | — | — |
| AFFINITY ™ GA1000R (MAH-g-E/O) | — | — | — | — | — | — | — | 59.4 | — |

TABLE 2-continued

| Adhesive Layers and Articles◇ | | | | | | | | | |
|---|---|---|---|---|---|---|---|---|---|
| ENGAGE ™ 8842 (E/O) | — | — | — | — | 59.4 | — | — | — | — |
| MAH-g-E/O 1 | — | — | — | 59.4 | — | — | — | — | — |
| ENGAGE ™ 8200 (E/O) | — | — | — | — | — | — | 59.4 | — | — |
| MAH-g-E/O 2 | — | — | — | — | — | 59.4 | — | — | — |
| ELVAX ™ 4260 (EVA/MAA) | — | — | — | — | — | — | — | — | 59.4 |
| BYNEL ™ 2002 (AM-E/A) | — | — | — | — | — | — | — | — | — |
| LOTADER ™ AX8920 (EMA/GMA) | — | — | — | — | — | — | — | — | — |
| Plasticizer | | | | | | | | | |
| POLYVEST ™ MA 120 (MAH-g-PBD) | 19.8 | — | 19.8 | 19.8 | 19.8 | 19.8 | 19.8 | 19.8 | 19.8 |
| POLYVEST ™ M75 (MAH-g-PBD) | — | — | — | — | — | — | — | — | — |
| Mineral Oil | — | — | — | — | — | — | — | — | — |
| Tackifier | | | | | | | | | |
| Rosin S 202 | 19.8 | — | — | — | — | — | — | — | — |
| PICOTAC ™ 1095 | — | 49.5 | 19.8 | 19.8 | 19.8 | 19.8 | 19.8 | 19.8 | 19.8 |
| PICOTAC ™ 9105 | — | — | — | — | — | — | — | — | — |
| PICOTAC ™ 9095 | — | — | — | — | — | — | — | — | — |
| REGALREZ ™ 1094 | — | — | — | — | — | — | — | — | — |
| REGALITE ™ 1090 | — | — | — | — | — | — | — | — | — |
| Crosslinking Agent | | | | | | | | | |
| Lauroyl Peroxide | 1 | 1 | 1 | 1 | 1 | 1 | 1 | 1 | 1 |

| PET-Cotton Fabric/Adhesive Layer/OBC Layer | | | | | | | | | |
|---|---|---|---|---|---|---|---|---|---|
| | 1B | 2B | 3B | 4B | 5B | 6B | 7B | 8B | 9B |
| Adhesive Coat Weight after Drying (g/m²) | 87 | 92 | 85 | 90 | 94 | 95 | 94 | 91 | 83 |
| Peel Strength (g/cm) After 80° C. Initial Roller Processing | 121 | 129 | 19.2 | 50.5 | 112 | 20.0 | 8.66 | 0 | 0 |
| Peel Strength (g/cm) After 130° C. Final Compression | 3142 | 3376 | 2906 | 2268 | 1303 | 2995 | 1256 | 474 | 502 |
| Peel Strength (g/cm) After 180° C. Oven | 620 | 279 | 602 | 951 | 222 | 120 | 69.2 | 1.97 | 38.1 |

| | CS 10 | CS 11 | Ex 12 | CS 13 | Ex 14 | Ex 15 | Ex 16 | Ex 17 | CS 18 |
|---|---|---|---|---|---|---|---|---|---|

| Adhesive Layer | | | | | | | | | |
|---|---|---|---|---|---|---|---|---|---|
| | 10A | 11A | 12A | 13A | 14A | 15A | 16A | 17A | 18A |
| Ethylene-Based Polymer | | | | | | | | | |
| AMPLIFY ™ GR216 (MAH-g-E/O) | — | — | 59.4 | 59.4 | 59.4 | 59.4 | 59.4 | 59.4 | — |
| AFFINITY ™ GA1000R (MAH-g-E/O) | — | — | — | — | — | — | — | — | — |
| ENGAGE ™ 8842 (E/O) | — | — | — | — | — | — | — | — | — |

TABLE 2-continued

| Adhesive Layers and Articles◇ | | | | | | | | | |
|---|---|---|---|---|---|---|---|---|---|
| MAH-g-E/O 1 | — | — | — | — | — | — | — | — | — |
| ENGAGE ™ 8200 (E/O) | — | — | — | — | — | — | — | — | — |
| MAH-g-E/O 2 | — | — | — | — | — | — | — | — | — |
| ELVAX ™ 4260 (EVA/MAA) | — | — | — | — | — | — | — | — | — |
| BYNEL ™ 2002 (AM-E/A) | 59.4 | — | — | — | — | — | — | — | — |
| LOTADER ™ AX8920 (EMA/GMA) | — | 59.4 | — | — | — | — | — | — | — |
| Plasticizer | | | | | | | | | |
| POLYVEST ™ MA 120 (MAH-g-PBD) | 19.8 | 19.8 | — | — | 19.8 | 19.8 | 19.8 | 19.8 | — |
| POLYVEST ™ M75 (MAH-g-PBD) | — | — | 19.8 | — | — | — | — | — | — |
| Mineral Oil | — | — | — | 19.8 | — | — | — | — | — |
| Tackifier | | | | | | | | | |
| Rosin S 202 | — | — | — | — | — | — | — | — | — |
| PICOTAC ™ 1095 | 19.8 | 19.8 | 19.8 | 19.8 | — | — | — | — | — |
| PICOTAC ™ 9105 | — | — | — | — | 19.8 | — | — | — | — |
| PICOTAC ™ 9095 | — | — | — | — | — | 19.8 | — | — | — |
| REGALREZ ™ 1094 | — | — | — | — | — | — | 19.8 | — | — |
| REGALITE ™ 1090 | — | — | — | — | — | — | — | 19.8 | — |
| Crosslinking Agent | | | | | | | | | |
| Lauroyl Peroxide | 1 | 1 | 1 | 1 | 1 | 1 | 1 | 1 | — |

| PET-Cotton Fabric/Adhesive Layer/OBC Layer | | | | | | | | | |
|---|---|---|---|---|---|---|---|---|---|
| | 10B | 11B | 12B | 13B | 14B | 15B | 16B | 17B | 18B |
| Adhesive Coat Weight after Drying (g/m²) | 114 | 77 | 97 | 96 | 99 | 90 | 85 | 80 | N/A |
| Peel Strength (g/cm) After 80° C. Initial Roller Processing | 0 | 0 | 285 | 215 | 430 | 31.5 | 13.7 | 60.0 | 0 |
| Peel Strength (g/cm) After 130° C. Final Compression | 523 | 396 | 2796 | 3839 | 2712 | 1893 | 3014 | 2755 | 21.1 |
| Peel Strength (g/cm) After 180° C. Oven | 340 | 2.68 | 731 | 724 | 1386 | 412 | 215 | 346 | 0 |

CS = Comparative Sample

N/A = Not Applicable

◇Weight percents are based on the total weight percent of the adhesive layer.

TABLE 3

Adhesive Layers and Articles◊

|  | CS 19 | CS 20 | Ex 21 | Ex 22 | CS 23 | Ex 24 | Ex 25 | CS 26 | CS 27 | CS 28 |
|---|---|---|---|---|---|---|---|---|---|---|

Adhesive Layer

|  | 19A | 20A | 21A | 22A | 23A | 24A | 25A | 26A | 27A | 28A |
|---|---|---|---|---|---|---|---|---|---|---|
| AMPLIFY ™ GR216 (MAH-g-E/O) | 99 | 49.5 | 59.4 | 39.6 | 73.3 | 39.6 | 59.4 | 49.5 | 39.6 | 74.25 |
| POLYVEST ™ M75 (MAH-g-PBD) | — | — | 19.8 | 9.9 | — | 29.7 | 19.8 | 49.5 | 49.5 | 24.75 |
| PICOTACT ™ 1095 | — | 49.5 | 19.8 | 49.5 | 25.7 | 29.7 | 19.8 | — | 9.9 | — |
| Lauroyl Peroxide | 1 | 1 | 1 | 1 | 1 | 1 | 1 | 1 | 1 | 1 |

PET-Cotton Fabric/Adhesive Layer/OBC Layer

|  | 19B | 20B | 21B | 22B | 23B | 24B | 25B | 26B | 27B | 28B |
|---|---|---|---|---|---|---|---|---|---|---|
| Adhesive Coat Weight after Drying (g/m$^2$) | 102 | 130 | 133 | 142 | 119 | 137 | 128 | 132 | 139 | 128 |
| Peel Strength (g/cm) After 80° C. Initial Roller Processing | 16.9 | 54.3 | 4.17 | 268 | 197 | 9.88 | 5.08 | 0 | 0 | 44.6 |
| Peel Strength (g/cm) After 130° C. Final Compression | 2762 | 1170 | 493.3 | 2162 | 4500 | 1960 | 1367 | 232.6 | 712.8 | 2188 |

CS = Comparative Sample
N/A = Not Applicable
◊Weight percents are based on the total weight percent of the adhesive layer.

TABLE 4

Adhesive Layers and Articles◊

|  | Ex 29 | Ex 30 | Ex 31 | Ex 32 | CS 33 | Ex 34 | Ex 35 | Ex 36 | Ex 37 | Ex 39 | Ex 40 |
|---|---|---|---|---|---|---|---|---|---|---|---|

Adhesive Layer

|  | 29A | 30A | 31A | 32A | 33A | 34A | 35A | 36A | 37A | 39A | 40A |
|---|---|---|---|---|---|---|---|---|---|---|---|
| Ethylene-Based Polymer | | | | | | | | | | | |
| AMPLIFY ™ GR216 (MAH-g-E/O) | 49 | 36.75 | 24.5 | 12.25 | — | 24.5 | 24.5 | 24.5 | 24.5 | 24.5 | 49 |
| ENGAGE ™ 8842 Plasticizer | — | 12.25 | 24.5 | 36.75 | 49 | 24.5 | 24.5 | 24.5 | 24.5 | 24.5 | — |
| POLYVEST ™ M75 (MAH-g-PBD) Tackifier | 1 | 1 | 1 | 1 | 1 | 1 | 1 | 1 | 1 | 1 | 1 |
| Rosin S202 | — | — | — | — | — | — | — | — | — | — | — |
| PICOTAC ™ 1095 | 49 | 49 | 49 | 49 | 49 | 49 | — | — | — | — | 49 |
| PICOTAC ™ 9105 | — | — | — | — | — | — | — | 49 | — | — | — |
| PICOTAC ™ 9095 | — | — | — | — | — | — | 49 | — | — | — | — |
| PICCOLYTE ™ F105 IG | — | — | — | — | — | — | — | — | 49 | — | — |
| FLORAL ™ AX-E Crosslinking Agent | — | — | — | — | — | — | — | — | — | 49 | — |
| Dicumyl Peroxide | 1 | 1 | 1 | 1 | 1 | 1 | 1 | 1 | 1 | 1 | 1 |

PET-Cotton Fabric/Adhesive Layer/OBC Layer

|  | 29B | 30B | 31B | 32B | 33B | 34B | 35B | 36B | 37B | 39B | 40B |
|---|---|---|---|---|---|---|---|---|---|---|---|
| Adhesive Coat Weight after Drying (g/m$^2$) | 135 | 135 | 142 | 139 | 125 | 142 | 161 | 148 | 116 | 140 | 144 |
| Peel Strength (g/cm) After 70° C. Initial Roller Processing | 10.6 | 50.0 | 113 | 30.3 | 57.9 | 113 | 35.4 | 44.5 | 30.3 | 14.2 | 76.8 |
| Peel Strength (g/cm) After 180° C. Final Compression | 3083 | 1985 | 3237 | 1524 | 1738 | 3237 | 2175 | 2612 | 2776 | 2781 | 3149 |

CS = Comparative Sample
◊Weight percents are based on the total weight percent of the adhesive layer.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An article comprising:

an adhesive layer having two opposing surfaces, the adhesive layer consisting of (i) from 20 wt % to 70 wt % of a functionalized ethylene-based polymer that is a maleic anhydride grafted ethylene-based polymer having a melt index from 0.1 g/10 min to 300 g/10 min;

(ii) from 1 wt % to 45 wt % of a functionalized hydrocarbon that is a maleic anhydride grafted polybutadiene;

(iii) from 15 wt % to 55 wt % of a tackifier; and (iv) from 0.1 wt % to 1.5 wt % of a crosslinking agent (v) optionally, a non-functionalized ethylene-based polymer that is not an ethylene/α-olefin multi-block copolymer;

(vi) optionally, an additive selected from the group consisting of antioxidant, antiblock additive, and combinations thereof;

a first layer in direct contact with a first surface of the adhesive layer, the first layer comprising a fabric comprising fiber selected from the group consisting of polyester fiber, polyamide fiber, cellulose fiber, and combinations thereof; and a second layer in direct contact with a second surface of the adhesive layer, the second layer consisting of (i) an ethylene/α-olefin multi-block copolymer having hard blocks and soft blocks and (ii) an optional additive selected from the group consisting of antioxidant, anti-block additive, and combinations thereof.

2. The article of claim 1 wherein the adhesive layer is crosslinked to the first layer.

3. The article of claim 2 wherein the adhesive layer is crosslinked to the second layer.

4. The article of claim 3, wherein the adhesive layer is crosslinked and the article has a peel strength after initial compression from 10 g/cm to 500 g/cm.

5. The article of claim 1, wherein the adhesive layer consists of:

(i) from 35 wt % to 70 wt % maleic anhydride grafted ethylene/1-octene copolymer;

(ii) from 1 wt % to 40 wt % maleic anhydride grafted polybutadiene;

(iii) from 15 wt % to 50 wt % of the tackifier; and (iv) from 0.1 wt % to 1.5 wt % of the crosslinking agent.

6. An article comprising:

an adhesive layer having two opposing surfaces, the adhesive layer consisting of (i) a functionalized ethylene-based polymer that is a maleic anhydride grafted ethylene-based polymer having a melt index from 0.1 g/10 min to 300 g/10 min;

(ii) a nonfunctionalized ethylene-based polymer that is not an ethylene/α-olefin multi-block copolymer;

(iii) from 1 wt % to 5 wt % of a functionalized hydrocarbon that is a maleic anhydride grafted polybutadiene;

(iv) from 30 wt % to 50 wt % of a tackifier; and (v) from 0.1 wt % to 1.5 wt % of a crosslinking agent, wherein a first opposing surface of the adhesive layer is in direct contact with a layer consisting of (i) an ethylene/α-olefin multi-block copolymer having hard blocks and soft blocks and (ii) an optional additive selected from the group consisting of antioxidant, antiblock additive, and combinations thereof.

7. The article of claim 6 wherein the nonfunctionalized ethylene-based polymer has a melt temperature from 35° C. to 60° C.

8. The article of claim 1 wherein the non-functionalized ethylene-based polymer is present.

9. The article of claim 8 wherein the non-functionalized ethylene-based polymer has a melt temperature from 35° C. to 60° C.

* * * * *